Aug. 25, 1959 L. G. WELLER 2,901,133
APPARATUS FOR TRANSPORTING LOOSE MATERIAL IN BULK
Filed July 30, 1957 3 Sheets-Sheet 1
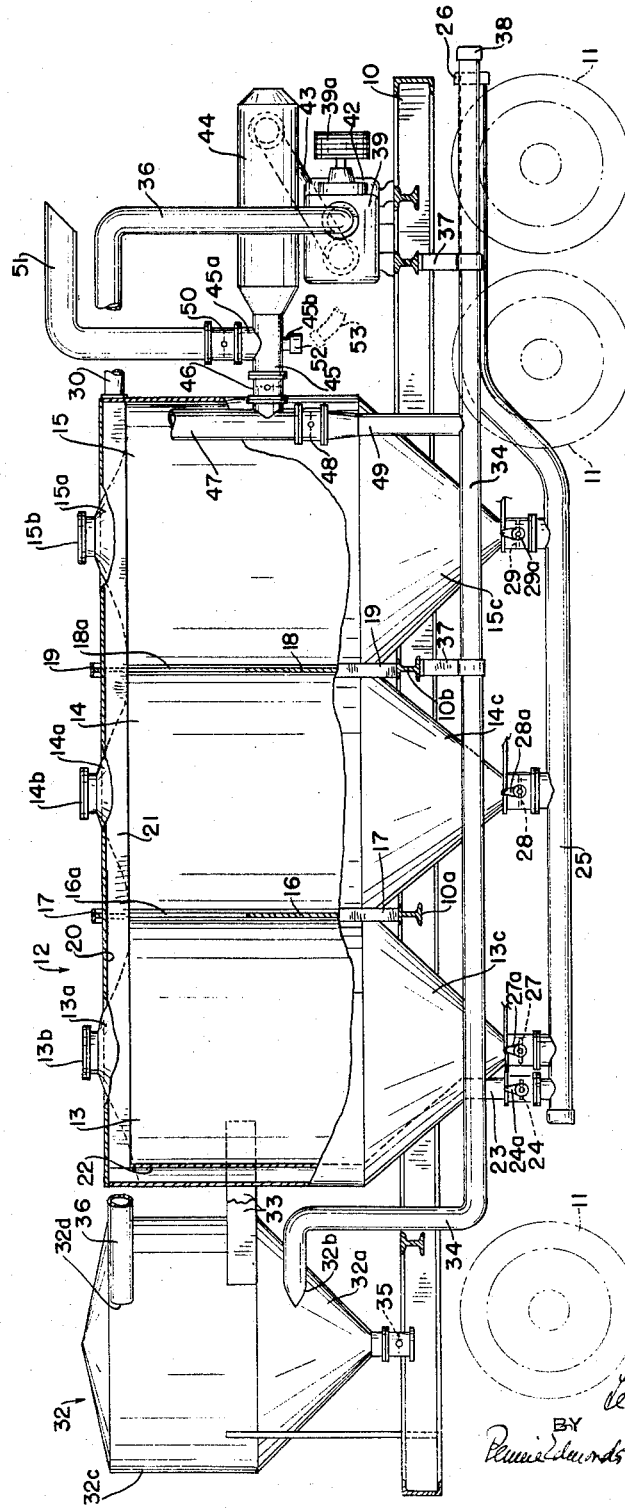
FIG. I
INVENTOR
Leo G. Weller
BY
ATTORNEYS Aug. 25, 1959     L. G. WELLER     2,901,133
APPARATUS FOR TRANSPORTING LOOSE MATERIAL IN BULK
Filed July 30, 1957     3 Sheets-Sheet 2
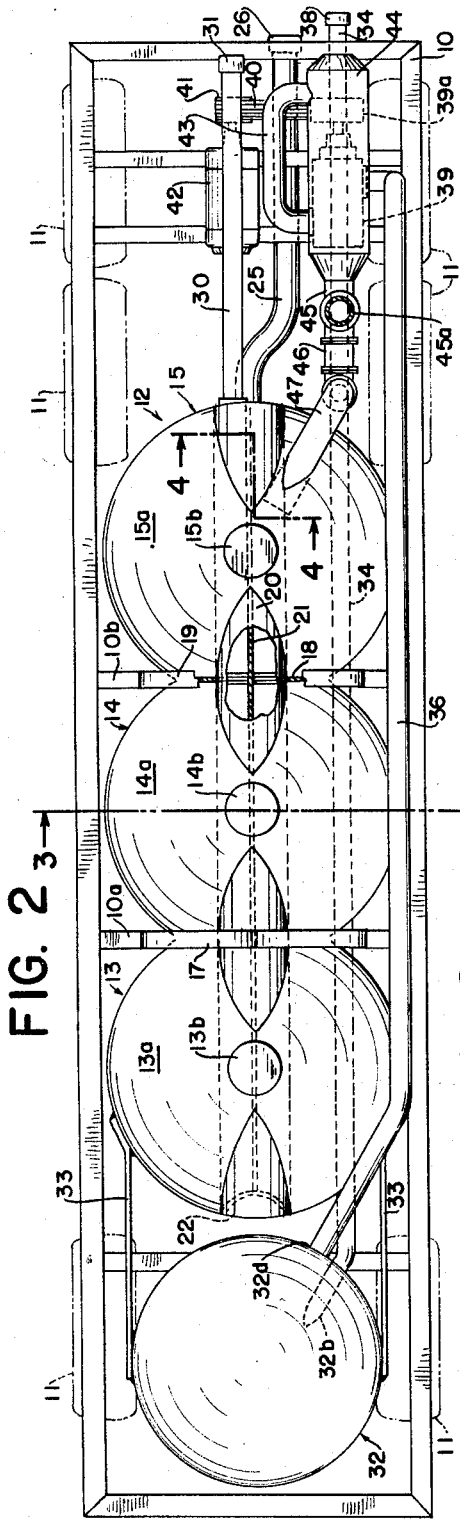
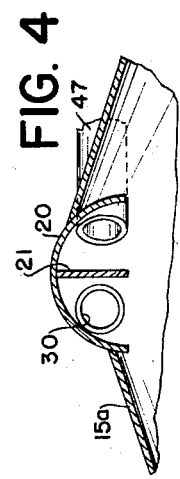
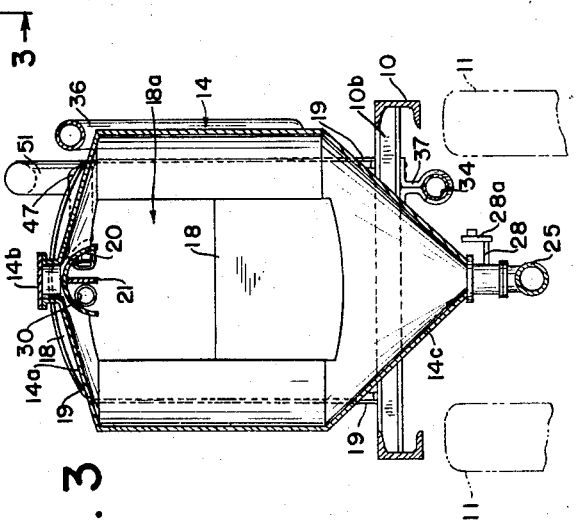

Aug. 25, 1959     L. G. WELLER     2,901,133
APPARATUS FOR TRANSPORTING LOOSE MATERIAL IN BULK
Filed July 30, 1957     3 Sheets-Sheet 3
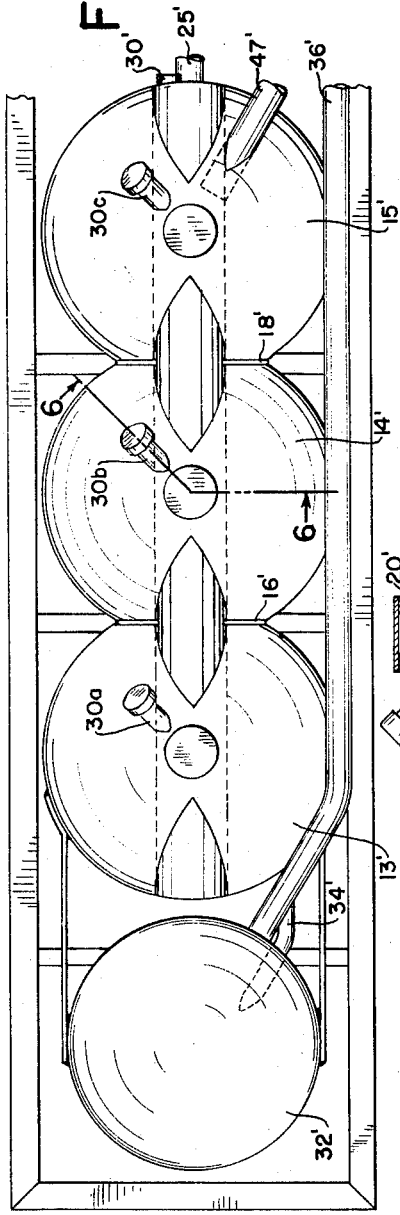
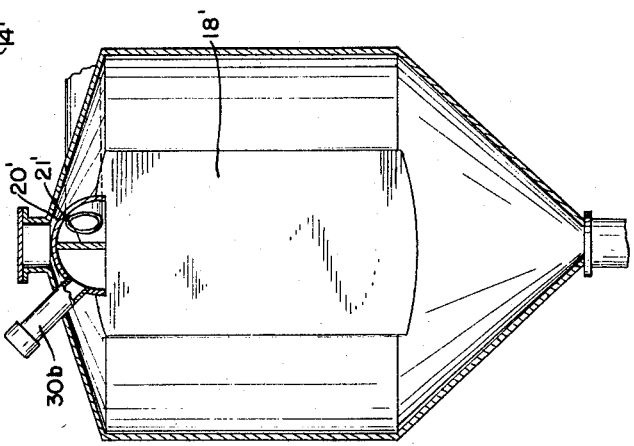
INVENTOR
Leo G. Weller
BY
ATTORNEYS United States Patent Office 2,901,133
Patented Aug. 25, 1959

2,901,133

APPARATUS FOR TRANSPORTING LOOSE MATERIAL IN BULK

Leo G. Weller, Catasauqua, Pa., assignor to Fuller Company, Catasauqua, Pa., a corporation of Pennsylvania Application July 30, 1957, Serial No. 675,097

9 Claims. (Cl. 214—83.28)

This invention relates to apparatus for transporting loose material in bulk and is concerned more particularly with a novel apparatus, which may be rapidly loaded and unloaded. The new apparatus includes a vehicle, upon which a tank for the material and the loading and unloading means are mounted, and the means provided are of the pneumatic type, so that the material can be conveyed through substantial distances and heights from the source of supply to the tank and from the tank to the bin or receptable at the point of delivery. The pneumatic means are constructed to remove from the material the fine particles or dust initially present therein or produced during the loading or unloading operations and the apparatus may thus be employed without creating a dust nuisance. The apparatus of the invention can be utilized in transporting materials of many kinds, but, since all its advantages are realized when it is used for transporting granulated sugar, a form of the apparatus suitable for that application will be illustrated and described in detail for purposes of explanation.

For a better understanding of the invention, reference may be made to the accompanying drawings, in which:

Fig. 1 is a view in side elevation with parts broken away and others shown diagrammatically of one form of the apparatus of the invention;

Fig. 2 is a top plan view of the apparatus of Fig. 1 with parts broken away;

Figs. 3 and 4 are sectional views on the lines 3—3 and 4—4 respectively, of Fig. 2;

Fig. 5 is a fragmentary plan view of a modified construction; and

Fig. 6 is a sectional view on the line 6—6 of Fig. 5.

The apparatus shown in the drawings comprises a vehicle of the trailer type having a frame 10 and wheels indicated at 11. A tank 12 for the material is mounted on the frame and the tank shown comprises three vertical intersecting cylindrical compartments 13, 14, and 15 having, respectively, conical tops 13a, 14a, and 15a with inlet hatches 13b, 14b, and 15b, which are capable of being sealed, and conical bottoms 13c, 14c, and 15c with outlets. The compartments 13, 14 are separated by a wall 16 formed of a plate, which is secured by welding to the adjacent edges of the walls of the compartments, projects outwardly beyond the walls, and is provided with a flange 17 along its side and top edges. The plate rests upon a transverse member 10a of the vehicle frame and has an opening 16a extending downwardly about half its length from its upper end. A similar plate 18 with an opening 18a and a peripheral flange 19 separates compartments 14 and 15 and rests upon a transverse frame member 10b of the vehicle.

An inverted channel 20 extends lengthwise of tank 12 from one end to the other thereof, the channel passing through the conical tops 13a, 14a, and 15a of the compartments beneath the hatches 13b, 14b, and 15b and spanning the spaces between the conical tops. The channel is open to the interior of the compartments and it is provided with a radial baffle 21 dividing it into two substantially equal sub-channels.

A duct 22 is formed within compartment 13 by a partition adjacent the end of the tank and the duct extends downwardly from the end of channel 20 and connects with an outlet pipe 23 containing a valve 24 operable by a handle 24a. The lower end of the valve is connected to a discharge conduit 25, which extends beneath the compartments of the tank to the rear end of the vehicle and is provided at its rear end with a coupling having a removable cap 26.

The conical bottom 13c of compartment 13 has an outlet leading to a discharge valve 27 operable by a handle 27a and connected at its lower end to the discharge conduit 25 at the down-stream side of the connection of valve 24 thereto. Similarly, the outlet from the conical bottom 14c of compartment 14 is connected through a valve 28 operable by a handle 28a to the discharge conduit 25 and the outlet from the conical bottom 15c of compartment 15 is connected to the discharge conduit through a valve 29 operable by a handle 29a.

In loading the tank, the material suspended in an air stream enters an intake pipe 30, which extends forwardly from the rear end of the vehicle and is provided at its rear end with a coupling with a removable cap 31. The forward end of pipe 30 is connected to the channel 20 at one side of the baffle 21.

A dust collector 32 of conventional form is mounted on the trailer frame forward of the tank 12 and may be secured to the tank by bracing 33. The collector has a lower conical portion 32a with an inlet 32b, to which the end of a pipe 34 is connected. The conical part of the collector is provided at its lower end with an outlet for solids, the discharge of which is controlled by a valve 35. Above the conical section 32a, the collector has a cylindrical section 32c with a gas outlet 32d, to which a pipe 36 is connected. The pipe 34 extends rearwardly beneath the frame and is supported by hangers 37 secured to transverse frame members. At its rear end, the pipe has a coupling with a removable cap 38.

A blower 39 is mounted on transverse members of the vehicle frame and its shaft carries a compound pulley 39a connected by belts 40 to a compound pulley 41 on the shaft of a motor 42 supported on the frame members. The blower has an inlet, to which the pipe 36 leads, and an outlet connected by a pipe 43 to a muffler 44. A pipe 45 connects the outlet of the muffler to a valve 46 connected to a pipe 47, which has one end connected to an opening into channel 20 on the opposite side of baffle 21 from the connection of pipe 30 to the channel. At its other end, pipe 47 is connected through a valve 48 to a pipe 49 connected to the pipe 34. A branch 45a leads from pipe 45 to a valve 50, from which an exhaust pipe 51 leads to the atmosphere. A second branch 45b from pipe 45 terminates in a coupling provided with a cap 52, which may be removed to permit a hose indicated at 53 to be attached to the coupling.

When the vehicle is to be loaded pneumatically, the cap 31 is removed from the end of intake pipe 30 and the pipe is connected by a hose or other suitable means to a source of supply of the material. Valve 46 is closed and valves 48 and 50 are opened. When the blower is started, a stream of air with material entrained therein is drawn through the intake conduit 30 and enters the rear end of channel 20 at one side of baffle 21. As the air stream loses velocity, the material carried thereby falls into the compartments and the air passes beneath the lower end of the baffle and returns through the channel at the other side of the baffle to escape through pipe 47. The air then passes through valve 48, pipe 49, and conduit 34 into the conical lower section 32a of the dust collector, where any material entrained in the air stream is separated from the air and collects above the solids outlet. The air escaping through the gas outlet 32d of the separator enters pipe 36, which leads the air stream to the intake of blower 39. From the blower, the air passes through muffler 44, pipe 45, branch 45a, valve 50, and exhaust pipe 51 to the atmosphere.

Since the air stream flowing through the apparatus travels through the dust collector before escaping to the atmosphere, any dust contained in the material initially or developed therein during the loading operation is removed from the air stream before the air is discharged. The creation of a dust nuisance at the apparatus during loading is, accordingly, prevented.

In some instances, the material to be supplied to the tank is discharged from a silo, bin, or other receptacle provided with a fluidizing conveyor, such as that disclosed in the patent to Schemm, 2,589,968, and, in that event, a portion of the air issuing from the blower may be used for supplying the conveyor. For this purpose, the cap 52 is removed from branch line 45b and the line connected by a hose or other means to the conveyor. The valve 50 is then closed to the extent necessary to insure that air at the proper pressure will be supplied to the conveyor through branch 45b.

When the apparatus is to be unloaded, the contents are commonly delivered to a bin or other receptacle at a substantial distance from the vehicle and sometimes at a substantially higher level than the vehicle. Before the blower is started, the valve 46 is opened and the valves 48 and 50 are closed, cap 26 is removed from the discharge conduit 25 and the conduit is connected by a hose or other suitable means to the delivery bin or receptacle. Also, the cap 38 is removed from the end of pipe 34 and, preferably, the interior of the bin or receptacle is connected by a hose or the like to the end of the pipe. When the blower is started, air from the bin is drawn through pipe 34 and enters the conical section 32a of the collector through inlet 32b. Any dust entrained in the air from the bin is separated from the air and collects in section 32a, while the air enters the cylindrical section 32c of the collector to escape through the outlet 32d and be conducted by pipe 36 to the blower intake. From the blower outlet, the air passes through muffler 44, pipe 45, valve 46, and pipe 47 into the channel 20. The air travels lengthwise through the channel and tank above the material and escapes through the interior duct 22 and valve 24 to produce an air stream flowing through the discharge conduit 25. One or more of the valves 27, 28, 29 are then opened to permit material to flow from compartments 13, 14, and 15 into the discharge conduit to be entrained in the air stream traveling therethrough and carried to the receiving bin. By regulating the valve 24, it is possible to maintain a pressure in tank 12 greater than that in the discharge conduit 25 and the higher pressure in the tank assists gravity in causing the flow of material from the tank compartments into the air stream in the conduit.

In the unloading operation, the continuous withdrawal of air from the receiving bin facilitates the delivery of material into the bin and also carries away any dust, which is subsequently removed from the air stream in the collector 32. Thus, as in the loading operation, dust present in the material or developed in the unloading operation is removed from the material and the creation of a dust nuisance in the vicinity of the delivery bin is avoided.

In the construction illustrated, the compartments of the tank are connected together through the openings in the partition walls 16, 18 and, in order to provide a sufficiently strong construction, these walls extend outwardly beyond the walls of the tank and are provided with flanges 17, 19. If desired, the tank compartments 13′, 14′, 15′ may be separated by solid partition walls, such as the wall 18′ as shown in Figs. 5 and 6. In that event, the walls may not extend laterally beyond the tank and be provided with flanges similar to flanges 17, 19. Also, when the compartments are separated from each other by solid walls, it is preferable to provide the individual compartments with intake extensions 30a, 30b, 30c, which may be used for admission of air-material streams into the compartments in filling the compartments pneumatically. These extensions lead to the interior of the channel 20′ at one side of the baffle 21′ and are normally closed by caps. By providing such separate compartments with separate intakes or with both separate intakes and a common intake 30, it is also possible to transport a number of different materials at the same time without substantial contamination.

In the discharge of the contents of the tank, when all the compartments contain the same material, the number of compartments opened to the discharge line 25 depends on the conditions of conveying, that is, on the distance the material is to be carried in suspension and the height to which the material is to be raised. Accordingly, when the conditions are not severe, all three compartments may be emptied at the same time. When the compartments are closed to one another and contain different materials, the compartments will, of course, be emptied one at a time.

Where gravity-filling of the tank is possible, the several compartments may be filled through their respective hatches 13b, 14b and 15b, instead of by the self-loading means and the intake pipe 30.

It is also contemplated that the apparatus of the present invention may be used for hauling liquids, for instance, a liquid sugar. In these instances, a suitable pump, which is frequently found available on tractors designed for liquid sugar transport, may be connected by piping or reenforced hosing from its intake to a suitable fitting in the discharge conduit 25, and operated to pump the solution therefrom to a storage or "use" tank. The hatches 13b, 14b and 15b are then used, singly or in combination, both for filling of the tank or compartments with the liquid, and for venting the tank during unloading to replace the volume of liquid being pumped out.

When it is desired to return the apparatus to the handling of dry solids, the interior is washed with an evaporable solvent for the material in solution, which in the case of liquid sugar may be warm or hot water. After washing of the interior, the tank is then dried by operation of the blower 39 and discharge of the compressed air through the tank through the various routes or means for access to the atmosphere. This drying air may be delivered through all compartments or areas simultaneously, or may be confined to a single compartment, for instance compartment 13, by closure of the valves 28 and 29 and hatches 13b, 14b and 15b, until that compartment is dried, after which the remaining areas similarly may be dried individually.

Where legal axle limits will permit filling substantially the entire volume of the tank with liquid, a valve may be provided in the pipe 47 to prevent passage or slopping of the liquid into the blower piping and the dust collector, and the danger of receiving or drawing liquid into the blower.

I claim:

1. Apparatus for transporting loose bulk material, which comprises a vehicle and, mounted on the vehicle, a tank having at least a pair of openings at its upper end and at least one outlet at its lower end, a closable intake pipe connected to one of the tank openings, a discharge conduit connected to the tank outlet, a valve for controlling flow through the outlet to the discharge conduit, a duct connecting the interior of the tank at its upper end to the discharge conduit at the upstream side of the point where the conduit is connected to the tank outlet, a dust collector having an inlet and separate outlets for gas and solids, conduit means connecting the second tank opening to the dust collector inlet and containing a valve, a blower having its intake connected to the gas outlet of the dust collector, connecting means between the blower outlet and the conduit means on the tank side of the valve in the conduit means, a valve in the connecting means, and a valved branch line leading to the atmosphere from the connecting means at the blower side of the valve in the connecting means.

2. The apparatus of claim 1, in which there is a closable branch line leading from the connecting means.

3. The apparatus of claim 1, in which the tank has a plurality of compartments, each having an outlet connected to the discharge conduit and a valve for controlling flow through the outlet to the discharge conduit.

4. The apparatus of claim 3, in which the tank compartments are open to one another for a substantial part of their height.

5. The apparatus of claim 3 in which an inverted channel extends above the compartments and is open thereto, the pair of tank openings being provided in said channel, and the duct leads from the channel.

6. The apparatus of claim 5 in which the compartments are closed to each other except through the channel.

7. The apparatus of claim 6 in which a plurality of closable intake pipes lead to the channel and communicate individually with respective compartments.

8. The apparatus of claim 5 in which the channel is subdivided lengthwise by a baffle and the pair of tank openings being provided in the channel on opposite sides of the baffle.

9. The apparatus of claim 5 in which the compartments have top inlets for the material, the top inlets opening above the top of the channel.

References Cited in the file of this patent

UNITED STATES PATENTS

| | | |
|---|---|---|
| 2,030,553 | Tiley | Feb. 11, 1936 |
| 2,089,347 | Dondlinger | Aug. 10, 1937 |
| 2,108,416 | Smith, et al. | Feb. 15, 1938 |
| 2,116,603 | Holly | May 10, 1938 |
| 2,780,369 | Kaney | Feb. 5, 1957 |
| 2,798,628 | Fisher | July 9, 1957 |